US011433602B2

United States Patent
Costabeber

(10) Patent No.: US 11,433,602 B2
(45) Date of Patent: Sep. 6, 2022

(54) STEREOLITHOGRAPHY MACHINE WITH IMPROVED OPTICAL GROUP

(71) Applicant: DWS S.R.L., Thiene (IT)

(72) Inventor: Ettore Maurizio Costabeber, Zane' (IT)

(73) Assignee: DWS S.R.L, Thiene (IT)

( * ) Notice: Subject to any disclaimer, the term of this patent is extended or adjusted under 35 U.S.C. 154(b) by 234 days.

(21) Appl. No.: 16/469,085

(22) PCT Filed: Dec. 6, 2017

(86) PCT No.: PCT/IB2017/057693
§ 371 (c)(1),
(2) Date: Jun. 12, 2019

(87) PCT Pub. No.: WO2018/104885
PCT Pub. Date: Jun. 14, 2018

(65) Prior Publication Data
US 2019/0366624 A1    Dec. 5, 2019

(30) Foreign Application Priority Data

Dec. 7, 2016  (IT) .................... 102016000124372

(51) Int. Cl.
*B29C 64/277*    (2017.01)
*B29C 64/135*    (2017.01)
(Continued)

(52) U.S. Cl.
CPC .......... *B29C 64/135* (2017.08); *B29C 64/124* (2017.08); *B29C 64/20* (2017.08);
(Continued)

(58) Field of Classification Search
CPC .... B29C 64/129; B29C 64/135; B29C 64/277
See application file for complete search history.

(56) References Cited

U.S. PATENT DOCUMENTS 7,758,329 B2 *   7/2010  Kihara ............... B33Y 30/00
                                                425/174.4
7,833,000 B2 *  11/2010  Kihara ............... B22F 10/10
                                                425/174.4
(Continued)

FOREIGN PATENT DOCUMENTS

EP    2 067 607         6/2009
KR    20080035514 A  *  4/2008  ............ B33Y 30/00
(Continued)

OTHER PUBLICATIONS

International Search Report of the International Searching Authority regarding PCT/IB2017/057693, dated Mar. 8, 2018 (5 pgs.).
(Continued)

*Primary Examiner* — Atul P. Khare
(74) *Attorney, Agent, or Firm* — Volpe Koenig

(57) ABSTRACT

A stereolithography machine (1) for making a three-dimensional object (O) that comprises a container (2) for a fluid substance (R), a source (3, 31, 32) of the predetermined radiation (RL, RL1, RL2), an optical group (4) configured to direct the radiation (RL, RL1, RL2) towards a reference surface (SR) of the fluid substance (R), and a control logic unit (5) configured to control the optical group (4) and/or the radiation source (3, 31, 32) so as to expose at least one portion of the reference surface (SR) to the radiation (RL, RL1, RL2). The stereolithography machine provides that the optical group (4) comprises a first optical sub-group (41) configured to be exposed to the radiation (RL, RL1, RL2) so as to instantaneously project the image of a first portion to be solidified onto the reference surface (SR) and a second optical sub-group (42) configured to selectively convey the radiation (RL, RL1, RL2) towards a point of the reference surface (SR) and to move such a point so as to progressively
(Continued)

expose a second portion to be solidified of the reference surface (SR).

11 Claims, 5 Drawing Sheets

(51) Int. Cl.
| | |
|---|---|
| *B29C 64/20* | (2017.01) |
| *B29C 64/40* | (2017.01) |
| *B29C 64/393* | (2017.01) |
| *B33Y 50/02* | (2015.01) |
| *B29C 64/124* | (2017.01) |
| *B29C 64/386* | (2017.01) |
| *B33Y 50/00* | (2015.01) |
| *B29C 64/268* | (2017.01) |
| *B29C 64/291* | (2017.01) |
| *B33Y 80/00* | (2015.01) |
| *B33Y 10/00* | (2015.01) |
| *B33Y 30/00* | (2015.01) |

(52) U.S. Cl.
CPC .......... *B29C 64/268* (2017.08); *B29C 64/277* (2017.08); *B29C 64/291* (2017.08); *B29C 64/386* (2017.08); *B29C 64/393* (2017.08); *B29C 64/40* (2017.08); *B33Y 50/00* (2014.12); *B33Y 50/02* (2014.12); *B33Y 10/00* (2014.12); *B33Y 30/00* (2014.12); *B33Y 80/00* (2014.12)

(56) References Cited

U.S. PATENT DOCUMENTS

| | | | |
|---|---|---|---|
| 8,454,879 B2* | 6/2013 | Kuzusako | B33Y 30/00 |
| | | | 264/401 |
| 9,550,326 B2* | 1/2017 | Costabeber | B29C 64/268 |
| 9,969,129 B2* | 5/2018 | Costabeber | B29C 64/393 |
| 10,300,661 B2* | 5/2019 | Marozin | B29C 64/40 |
| 10,311,175 B2* | 6/2019 | Marozin | G06F 30/20 |
| 2008/0157412 A1 | 7/2008 | Kihara et al. | |

FOREIGN PATENT DOCUMENTS

| | | | |
|---|---|---|---|
| WO | 2009026520 | 2/2009 | |
| WO | WO-2015145346 A1 * | 10/2015 | .......... B29C 64/386 |
| WO | 2016007495 | 1/2016 | |

OTHER PUBLICATIONS

Written Opinion of the International Searching Authority regarding PCT/IB2017/057693, dated Mar. 8, 2018 (9 pgs.).

* cited by examiner

STEREOLITHOGRAPHY MACHINE WITH IMPROVED OPTICAL GROUP

The invention concerns a stereolithography machine of the type adapted for making three-dimensional objects through a plurality of juxtaposed layers, wherein each layer is obtained by selective solidification of a fluid substance in the areas corresponding to the volume of the object to be produced.

Moreover, the invention concerns a method for making three-dimensional objects through a stereolithography process carried out through the stereolithography machine of the invention.

A known stereolithography machine comprises a container in which the fluid substance, generally a photosensitive resin in liquid or paste state, is arranged. The machine also comprises a source that, generally, is of the luminous type and emits a radiation adapted for solidifying the fluid substance.

An optical group takes care of conveying the aforementioned radiation towards a reference surface arranged inside the container, which corresponds to the surface of the layer of the object to be solidified closer to the aforementioned optical group.

The three-dimensional object in formation is supported by a modelling plate, which is vertically mobile with respect to the container so as to be able to arrange the last solidified layer of the object in a position adjacent to the aforementioned reference surface.

In this way, after each layer has been solidified, the modelling plate is moved so as to arrange the newly solidified layer adjacent to the reference surface; after that, the process can be repeated for the subsequent layer.

Stereolithographic machines of the aforementioned type are divided into two main embodiments.

A first of the aforementioned embodiments foresees that the reference surface is arranged adjacent to the bottom of the container, which is transparent to radiation.

In this case, the fluid substance is irradiated from below and the three-dimensional object is formed under the modelling plate.

The second embodiment foresees that the reference surface is arranged at the free surface of the fluid substance.

In this second case, the fluid substance is irradiated from above and the three-dimensional object is formed on top of the modelling plate.

It is known that, for both of the aforementioned embodiments, the conveying of the radiation in the different points of the reference surface is obtained with a single optical group, selected from different known optical groups.

In particular, a first type of optical group comprises a matrix of mirrors that can be controlled individually so as to project the image of the layer of the object onto the reference surface.

Even more specifically, each mirror can take up two different positions—an active position in which the radiation is reflected towards a corresponding point of the reference surface and a passive position in which the radiation is to be reflected towards a dispersion area.

Such a type of optical group is known in the jargon as "Digital Light Processing" projector or by the acronym DLP.

The aforementioned matrices of mirrors are capable of simultaneously illuminating the entire reference surface, making it possible to obtain each layer through a single exposure and, therefore, particularly quickly.

However, the matrices of mirrors have a limited definition, with the drawback of obtaining objects with irregular edges or outer surfaces.

A further limitation of the aforementioned systems is the fact that the image that they generate has a uniform light intensity over the entire reference surface thereof.

Therefore, the drawback arises that such systems do not allow the light power to be adjusted in the different areas of the reference surface.

A second type of optical group, present in stereolithographic machines of the prior art, as an alternative to the aforementioned matrices of mirrors, provides for conveying the radiation in a single point of the reference surface and moving such a point so as to be able to progressively illuminate the entire portion of the reference surface corresponding to the volume of the object.

With respect to the type of optical group described above, this has the advantage of being able to direct the light beam in any point of the reference surface, making it follow continuous trajectories and thus obtaining objects that are free from irregularities.

Moreover, this type of optical groups advantageously makes it possible to modify the light intensity in the different areas of the reference surface.

In even greater detail, a known embodiment of the optical group of the second type described above provides a laser source that is moved on two perpendicular axes through a mechanical device.

This embodiment has the drawbacks that the movement of the light beam is very slow and that, moreover, the mechanical movement device can suffer breaking and, therefore, requires a certain amount of maintenance.

Alternatively, a different embodiment of optical group of the second type provides the use of a fixed source, usually a laser source, and a pair of mirrors arranged in series one after the other, usually a galvo head, to direct the light beam.

Each mirror is motorised to be able to rotate around a respective rotation axis perpendicular to the axis of the other mirror, so that the combination of their rotations makes it possible to direct the beam in any point of the reference surface.

With respect to the system that includes the movement of the laser quoted earlier, what has just been described has the advantages of allowing a high speed of movement of the beam, due to the lower inertia of the galvanometric mirrors, and a greater reliability, due to the lower number of mechanical components.

Despite the aforementioned advantages, such an optical group of the second type, i.e. that which provides for conveying the radiation in a single point of the reference surface, disadvantageously has the drawback of lengthening the solidification times of the portions of the aforementioned reference surface that belong to the volume of the object to be made, since it is necessary, as stated earlier, to move the aforementioned point conveyed progressively on all of the points that constitute each of such portions.

Document EP 2067607 describes a stereolithography machine for making a three-dimensional object comprising a first optical sub-group configured to be exposed to one radiation so as to instantaneously project the image of a first portion to be solidified corresponding to a portion of volume of a three-dimensional object onto a reference surface and a second optical sub-group configured to selectively convey the radiation towards a point of the reference surface and to move the point so as to progressively expose a second portion to be solidified of the reference surface corresponding to a portion of volume of the three-dimensional object.

Document US2008/157412 describes an optical modeling apparatus that forms a model of a desired shape by sequentially forming hardened layers by irradiating a light curable resin with light. The apparatus includes a first light source that emits a light beam for plotting on the resin, a scanning device that scans the light beam from the first light source over the resin, a second light source that emits light that irradiates one fixed region of the resin at a time, a spatial light modulator that spatially modulates the light from the second light source and blanket-exposes a specified region of the resin, and an exposure position adjuster that moves, in at least one direction, the light from the spatial light modulator. The light beam from the scanning device and the light from the spatial light modulator form each hardened layer.

The present invention aims to overcome all of the aforementioned drawbacks belonging to the prior art.

In particular, a purpose of the invention is to make a stereolithography machine that makes it possible to obtain objects with a high definition and at the same time allows the stereolithography process to be carried out to make such an object quickly.

Furthermore, a purpose of the invention is to make a versatile stereolithography machine, i.e. capable of adapting the mode of execution of the stereolithography process itself based on the characteristics of the three-dimensional object to be made, in order to obtain an optimal compromise between speed of execution and quality of the object produced.

The aforementioned purposes are accomplished by a stereolithography machine made according to the main claim.

Further detailed characteristics of the invention are given in the relative dependent claims.

The invention also comprises the method for making three-dimensional objects through the application of a stereolithography process carried out through the stereolithography machine of the invention.

The aforementioned purposes and advantages, together with others that will be mentioned hereinafter, will become clear during the following description of some preferred embodiments of the invention that are given, by way of not-limiting example, with reference to the attached tables of drawings, where:

FIGS. 1 and 2 schematically represent the stereolithography machine of the invention according to a first preferred embodiment, in a side view and in an axonometric view, respectively;

FIGS. 3 and 4 schematically represent the stereolithography machine of the invention according to an alternative embodiment with respect to the first preferred embodiment of FIGS. 1 and 2, in a side view and in an axonometric view, respectively;

Figure 1:
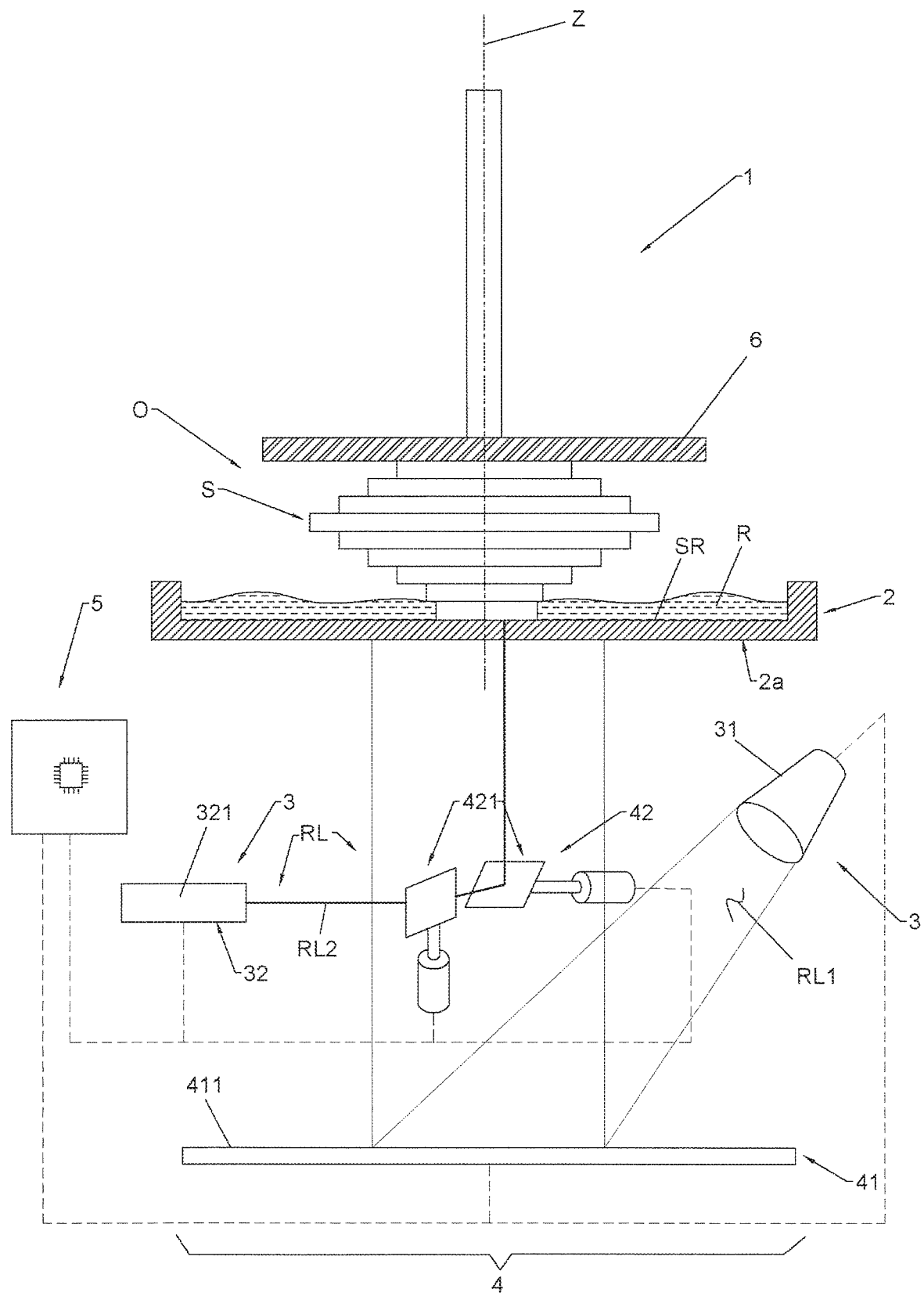
Figure 2:
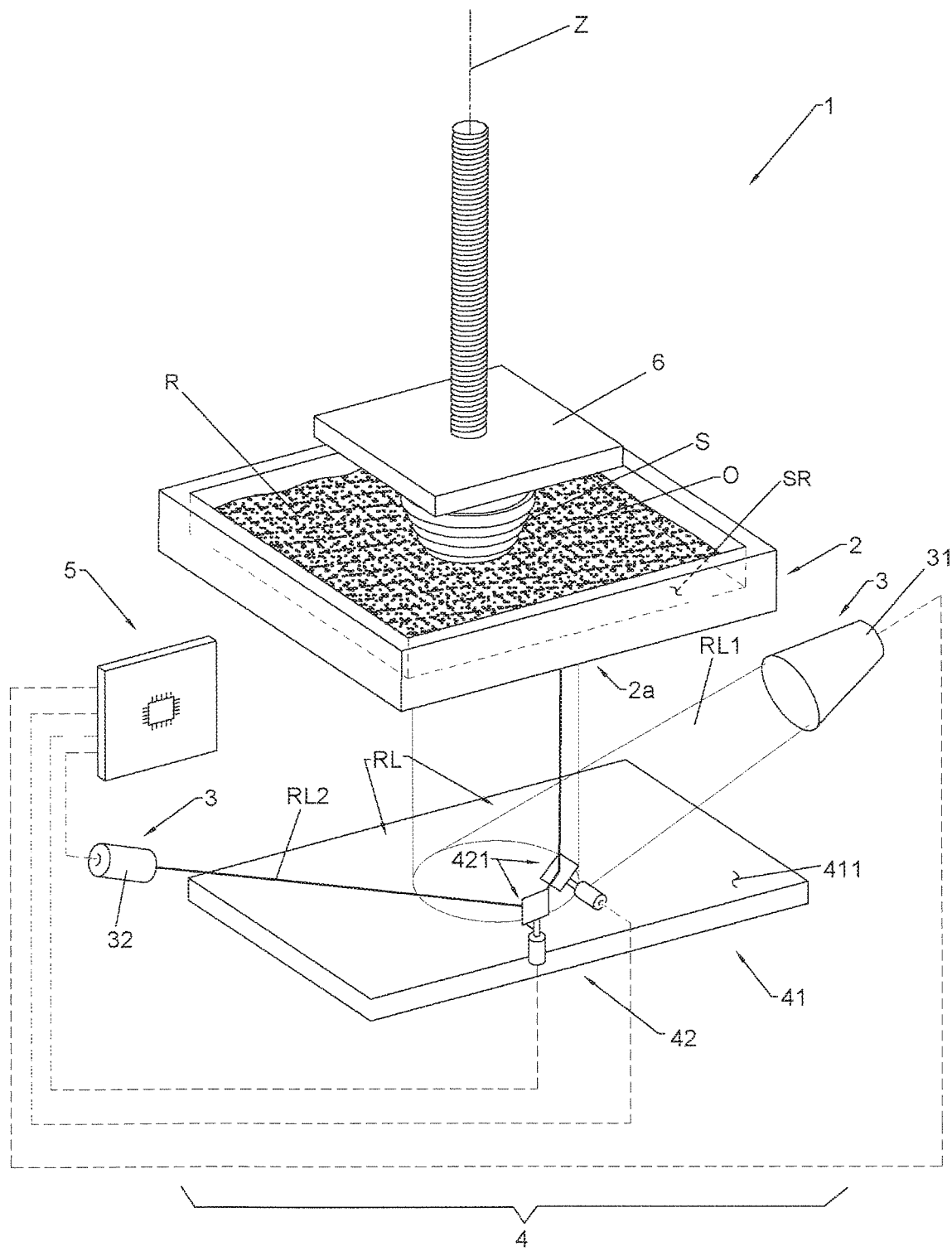

The stereolithography machine of the invention, wholly indicated in FIGS. 1 and 2 with 1, makes it possible to produce a three-dimensional object O through a stereolithography process that provides to pile up a plurality of layers S obtained through selective exposure of a fluid substance R to at least one predetermined radiation RL adapted for solidifying it.

Preferably, the aforementioned fluid substance R is a photosensitive liquid resin and the predetermined radiation RL is a light radiation tuned in the visible or ultraviolet field.

Clearly, in variant embodiments of the invention, the fluid substance R can be of any kind, liquid or paste, provided that it is adapted for solidifying when exposed to a predetermined radiation RL.

The stereolithography machine 1 also comprises a container 2 for the aforementioned fluid substance R and a modelling plate 6 for supporting the object O in formation, motorised according to a vertical movement axis Z.

The machine 1 comprises at least one source 3, as will be specified hereinafter, to emit the aforementioned predetermined radiation RL and an optical group 4 adapted for directing the radiation RL towards one or more of any portions of a reference surface SR, which corresponds to the surface closest to such an optical group 4 of the layer S of fluid substance R being solidified.

Preferably, the aforementioned reference surface SR is flat and is arranged adjacent to the bottom 2a of the container 2, as can be observed in FIG. 1.

In this case, the optical group 4 is configured to direct the predetermined radiation RL from the bottom towards the top so that it is incident on the bottom 2a.

Moreover, the bottom 2a is transparent to the radiation RL so that the latter can hit the fluid substance R arranged close to the bottom itself to solidify it. According to this embodiment, the three-dimensional object O is made below the modelling plate 6, as can be seen in FIG. 1.

A variant embodiment of the invention, not represented, on the other hand foresees that the optical group is configured to direct the radiation RL from the top towards the bottom on the free surface of the fluid substance R present in the container 2.

In this case, the object is made above the modelling plate 6.

In both of the aforementioned variant embodiments, the stereolithography machine 1 comprises a control logic unit 5 configured to control the optical group 4 and/or the source 3 so as to expose the fluid substance R to the radiation RL selectively at one or more predetermined portions of the reference surface SR.

Specifically, the aforementioned predetermined portions are relative to the portions of volume that correspond, on each occasion, to each layer S of the three-dimensional object O.

According to the invention, the optical group 4 comprises a first optical sub-group 41 configured to be exposed to the aforementioned predetermined radiation RL so as to instantaneously and integrally project the image of a predetermined first portion to be solidified of the three-dimensional object O onto the reference surface SR.

According to the preferred embodiment of the invention, in particular, such a first optical sub-group 41 is provided with a matrix of mirrors 411 configured to be controlled individually so as to indeed project the image of the aforementioned first predetermined portion to be solidified instantaneously and integrally onto the reference surface SR, when exposed to the aforementioned radiation RL.

In particular, such a first optical sub-group 41 comprises a so-called Digital Light Processing or DLP projector.

Such a first optical sub-group 41, specifically the matrix of mirrors 411, as already stated in the description of the prior art, therefore makes it possible to simultaneously illuminate all of the points of each first portion of the reference surface SR that defines the volume of the three-dimensional object O, making it possible to carry out, for each layer S, the solidification of each of the aforementioned first portions through a single exposure and, therefore, particularly quickly.

According to some variant embodiments of the invention, not represented in the figures, the first optical sub-group 41 could comprise, instead of the matrix of mirrors 411, an LCD, an LCoS or D-ILA system, provided that also according to these variant embodiments, the first optical sub-group 41 is in any case configured to be exposed to the radiation RL and provided that it is in any case capable of reflecting the aforementioned radiation RL so as to instantaneously and integrally project the image of a first predetermined portion to be solidified of the three-dimensional object O onto the reference surface SR.

Furthermore, a further variant embodiment of the invention, not represented in the figures, could foresee that the aforementioned first optical sub-group 41 comprises a system known in the jargon as "Direct Mask", which consists of placing between the source 3 and the reference surface SR a transparent film suitably shaded at the portions through which it is not intended to let the radiation RL generated by the same source 3 pass. In this way, therefore, a mask is defined that allows the radiation RL to pass and therefore allows such radiation RL to be instantaneously and integrally projected only at the portions of the reference surface SR that are intended to be solidified.

Furthermore, again according to the invention, the optical group 4 also comprises a second optical sub-group 42 configured to selectively convey the predetermined radiation towards a point of the reference surface SR and to move such a point so as to progressively expose a second portion of the reference surface SR corresponding to a second portion of the volume of the aforementioned three-dimensional object O.

In this case, the pointed radiation generated by the aforementioned second optical sub-group 42 and the possibility of moving such pointed radiation along the aforementioned reference surface SR makes it possible to follow continuous trajectories, thus obtaining objects that are very definite and free from irregularities.

According to the preferred embodiment of the invention, the second optical sub-group 42 comprises a pair of mirrors 421 arranged in series one after the other so as to convey the radiation RL towards a point of the reference surface SR and to move such a point so as to progressively expose a second portion of the same reference surface SR. In even greater detail, preferably but not necessarily, such a pair of mirrors 421 belongs to a galvo head.

However, this does not rule out the possibility that, according to an alternative embodiment of the invention not represented in the figures, each mirror of the aforementioned pair of mirrors 421 is a micro-mirror belonging to a relative micro-opto-electro-mechanical system (MOEMS) provided with a support structure and with articulation means, both associated with such a micro-mirror to define a rotation axis for the same micro-mirror.

In other words, the second optical sub-group 42 comprises two micro-opto-electro-mechanical systems (MOEMS), each of which, as well as providing a micro-mirror, the support structure and the articulation means, also comprises actuator means adapted to move the relative micro-mirror around such an axis. However, this does not rule out the possibility that according to further variant embodiments of the invention, such a second optical sub-group 42 can include a different structure from those described above, provided that it is configured to selectively convey the predetermined radiation RL towards a point of the reference surface SR and to move such a point so as to progressively expose a second portion of the same reference surface SR.

As far as the control logic unit 5 according to the invention is concerned, it is configured to control the first optical sub-group 41 and the second optical sub-group 42 independently from one another.

This means that the control logic unit 5 is capable, for every layer S to be solidified of the three-dimensional object O, of selecting whether to use the first optical sub-group 41 for the exposure to the aforementioned radiation RL of at least one first portion of the reference surface SR and to use the second optical sub-group 42 for the exposure to the same radiation RL of at least one second portion of the reference surface SR.

Such first portion and second portion, at a single layer S, could belong to the same three-dimensional object O or could also form the layers of two distinct three-dimensional objects O being simultaneously realized on the same reference surface SR below the modelling plate 6.

In this case the exposure through the above-mentioned two optical sub-groups 41 and 42 might be carried out simultaneously.

Alternatively, the control logic unit 5 is capable of selecting whether to use exclusively the first optical sub-group 41 or, furthermore, exclusively the second optical sub-group 42 for the solidification of all of the portions of reference surface SR that define the volume of the aforementioned three-dimensional object O, for each single layer S. It should be specified that the control logic unit 5 is configured to make such a choice independently from layer to layer. Hereinafter some criteria will be described, according to the invention, for discriminating, for each layer 5, the first portions of the reference surface SR to be solidified through the first optical sub-group 41 and the second portions of the same reference surface SR to be solidified through the second optical sub-group 42.

However, it is clear as of now that, taking into account the specific technical advantages mentioned above, able to be obtained with one or other of the two optical sub-groups 41 and 42, the discrimination logic of the invention provides to select the use of the first optical sub-group 41 at the moment when it is necessary to expose to the aforementioned radiation RL and solidify a portion of the reference surface SR of large dimensions and that does not require a high definition of its edges, whereas such a logic provides to select the use of the second optical sub-group 42 at the moment when it is necessary to expose and solidify a portion of the reference surface SR that is not very large, but requires a high definition of its edges.

As far as the predetermined radiation RL and, therefore, the source 3 of such predetermined radiation RL are concerned, the preferred embodiment of the stereolithography machine 1 of the invention includes the presence of a first source 31 of a first predetermined radiation RL1 directed towards the first optical sub-group 41 and of a second source 32 of a second predetermined radiation RL2 directed towards the second optical sub-group 42.

In particular, as far as the first source 31 is concerned, it is configured to generate a first radiation RL1 of large dimensions, preferably of greater dimensions with respect to the area defined by the aforementioned matrix of mirrors 411, so as to be able to illuminate a large number, if not the totality, of the aforementioned mirrors. This, therefore, makes it possible to reflect the first radiation RL1 hitting the matrix of mirrors 411 towards the reference surface SR, having the possibility of exploiting the entire area defined by the same matrix of mirrors 411.

On the other hand, as far as the second source 32 is concerned, it preferably but not necessarily is a laser source 321 that generates a pointed beam of light which, in turn, is directed so as to hit in sequence the aforementioned pair of mirrors 421 belonging to the second optical sub-group 42.

Preferably but not necessarily, the laser source 321 is selected and is managed so that the size of the spot of the laser beam generated is comprised between 1 mm and 1.5 mm at the point of incidence of the aforementioned reference surface SR.

According to such a preferred embodiment of the invention, the control logic unit 5 is configured to control the first optical sub-group 41 and/or the relative first radiation source 31 so as to expose at least one predetermined first portion of the reference surface SR to the first radiation RL1 and simultaneously or alternatively, for each layer S, to control the second optical sub-group 42 and/or the second source 32 so as to expose at least one second portion of the reference surface SR to the second radiation RL2.

As previously mentioned, in this case, the control unit 5 could be configured to expose a first predetermined portion belonging to a first three-dimensional object O to the first light radiation RL1 and at the same time to expose a second predetermined portion, defined on the same layer S and belonging to a second three-dimensional object O, different from the first object O, to the aforementioned second light radiation RL2.

Figure 3:
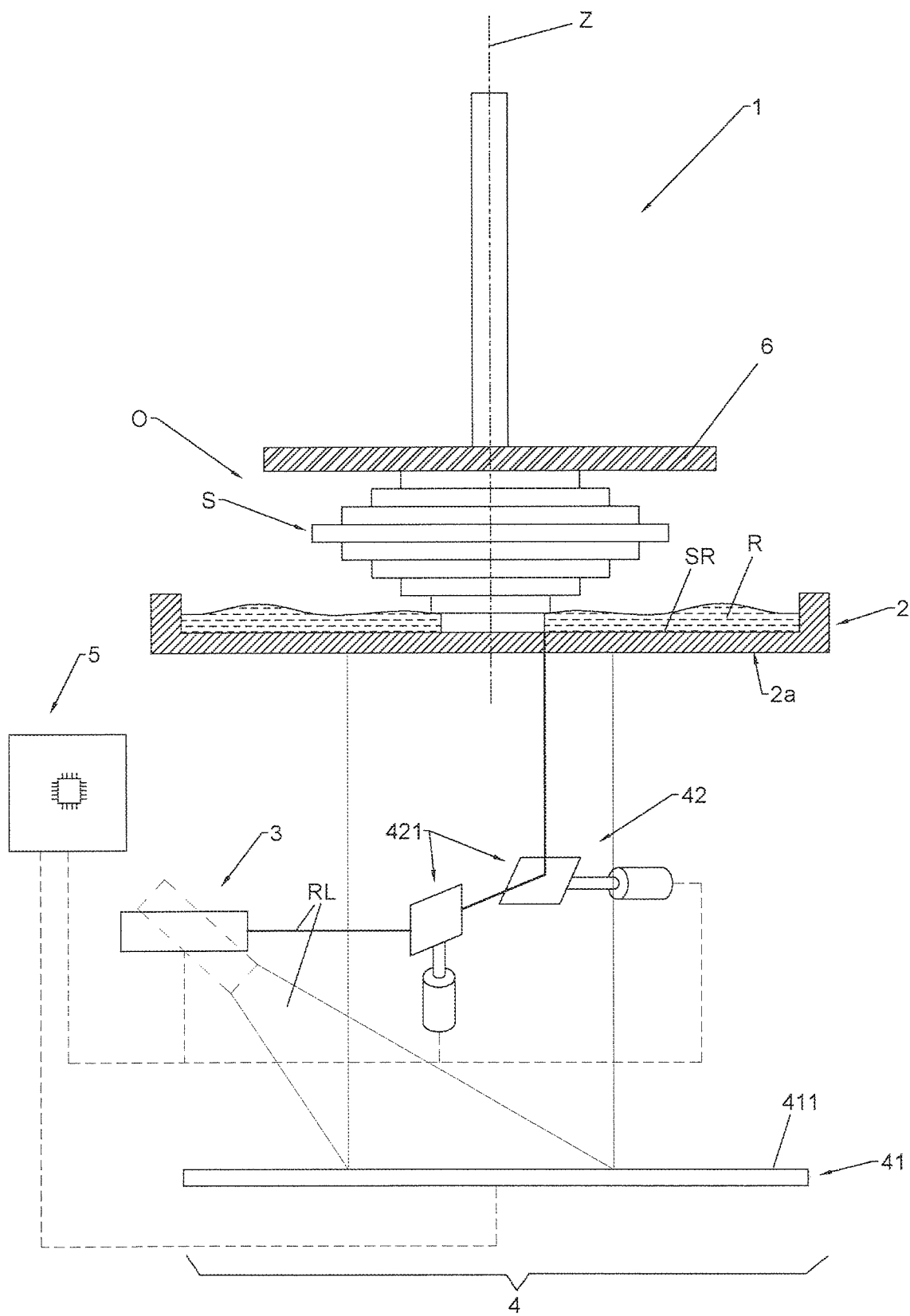
Figure 4:
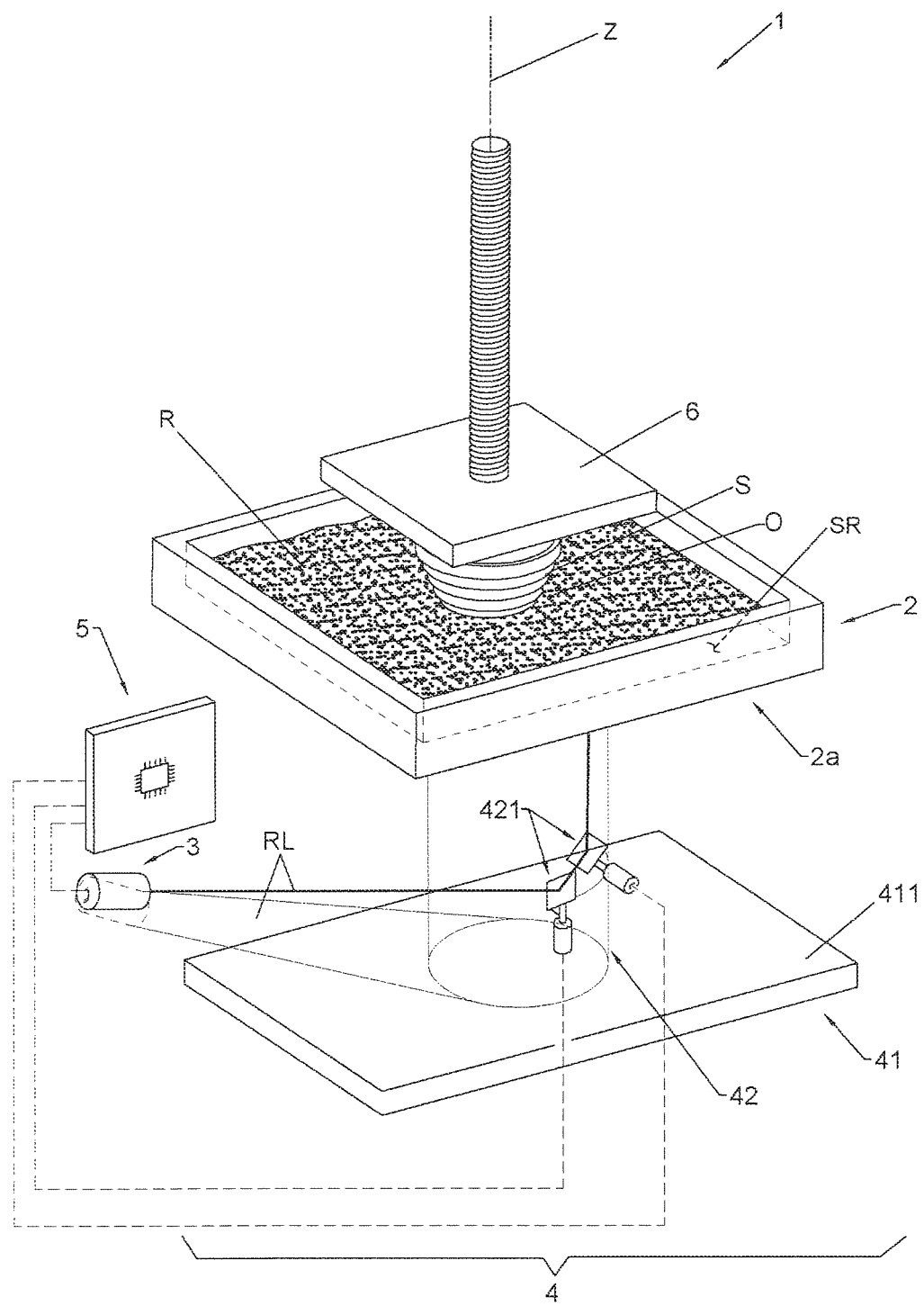

According to an alternative embodiment of the invention represented in FIGS. 3 and 4, it is not however ruled out for the stereolithography machine 1 to provide a single source 3 of the predetermined radiation RL configured to irradiate, obviously alternately, the first optical sub-group 41 and the second optical sub-group 42.

In the aforementioned two FIGS. 3 and 4 the source 3 is represented figuratively arranged in both such alternative situations.

According to such an alternative embodiment, the control logic unit 5 is therefore configured to control the source 3 so as to direct the predetermined radiation RL alternately towards the first optical sub-group 41 and towards the second optical sub-group 42.

However, in this last alternative embodiment of the invention, the control logic unit 5 is also configured to vary the size of the radiation RL emitted by the aforementioned source 3 since, as is clear, in the case of use of the first optical sub-group 41 it is necessary to irradiate a large number of mirrors belonging to the aforementioned matrix of mirrors 411, whereas in the case of use of the second optical sub-group 42, the spot of the light beam must clearly be of the pointed type (from 1 mm to 1.5 mm).

In particular, such an alternative embodiment of the invention foresees that the aforementioned single source 3, preferably but not necessarily, is a laser source the emitted light beam of which can be varied in size, based on which of the two optical sub-groups 41 and 42 it has to irradiate.

A further aspect of the invention concerns the method for making a three-dimensional object O through a stereolithography process carried out through the stereolithography machine of the invention 1, having the characteristics described earlier, including the variant embodiments.

In the current context, the term three-dimensional object O is meant to indicate the whole of the elements comprising the actual main body CP of the three-dimensional object O, i.e. the element that is actually intended to be produced, a support base BS necessary to carry out the stereolithography process and a plurality of support elements ES adapted for connecting the support base BS to the same main body CP.

Figure 5:
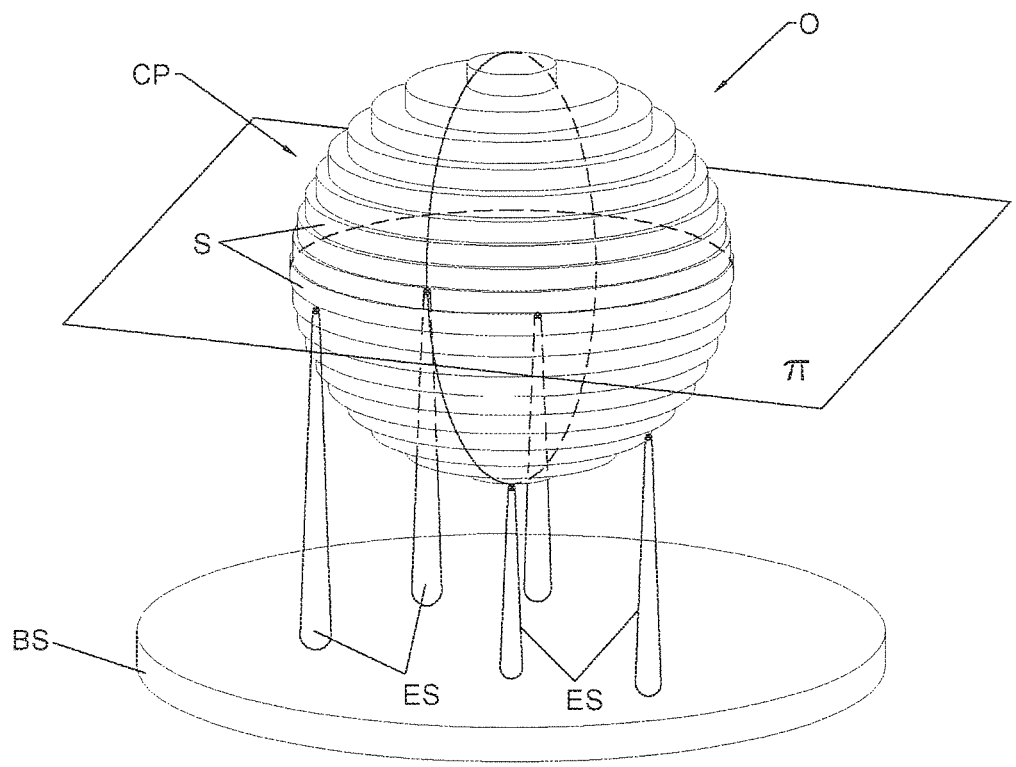
FIG. 5 represents an example of a three-dimensional object able to be made through the method of the invention using the stereolithography machine of the invention.

In order to better understand what are the elements that make up a three-dimensional object O according to the current context, FIG. 5 shows an example in which the main body CP is represented by a ball connected to the support base BS through the aforementioned plurality of support elements ES, comprising in particular a plurality of support columns.

Going back to the method for making a three-dimensional object O through a stereolithography process and the stereolithography machine 1 of the invention, as known, it must provide to lay a layer S of the fluid substance R inside the container 2 so as to define a reference surface SR and to expose at least one portion of the aforementioned reference surface SR to the predetermined radiation RL.

Clearly, the portion of the aforementioned reference surface SR to be exposed to the predetermined radiation RL represents the portion of volume in the specific layer S of the three-dimensional object O to be made.

The method thus provides to repeat such laying and such exposure for all of the consecutive layers S that define the three-dimensional object O.

According to the invention, the method provides, for each layer S, to expose to the aforementioned radiation RL the portions of the reference surface SR relative to the support base BS of the three-dimensional object O through the use, preferably exclusively, of the first optical sub-group 41 belonging to the stereolithography machine 1.

Indeed, advantageously, since the various portions of the various layers S that define the support base BS have a large size and at the same time do not require a high definition, the use of the first optical sub-group 41 makes it possible to drastically reduce the time to make the aforementioned support base BS with respect to a potential use of the second optical sub-group 42.

Preferably but not necessarily, the method of the invention provides, for every layer S, to expose to the radiation RL through the first optical sub-group 41 also the portions of the reference surface SR relative to the support elements ES of the same three-dimensional object O.

In this case, however, the advantage of a greater speed of execution of the stereolithography process to make the support elements ES with the use of the first optical sub-group 41 with respect to the use of the second optical sub-group 42 is not as clear as in the case of the support base BS, since the size of each single portion relative to a support element ES is not very large.

The advantage obtained with the use of the first optical sub-group 41 rather than the second optical sub-group 42 to make the support elements ES is clear at the moment when the number of the same support elements ES is high. Indeed, with the use of the first optical sub-group 41 it is possible to simultaneously solidify, for each single layer S that concerns the support elements ES, the plurality of portions relative to the same support elements ES, whereas in the case of use of the second optical sub-group 42 the solidification of each of the aforementioned portions necessarily takes place at temporally distinct moments.

Clearly, since the support elements ES, as well as the support base BS, at the end of the stereolithography process are separated from the main body CP, having completed their function, also in this case the level of definition with which they have been made is not of fundamental importance.

However, this does not rule out the possibility that according to different embodiments of the method of the invention the support elements ES can be made using the second optical sub-group 42.

Figure 6:
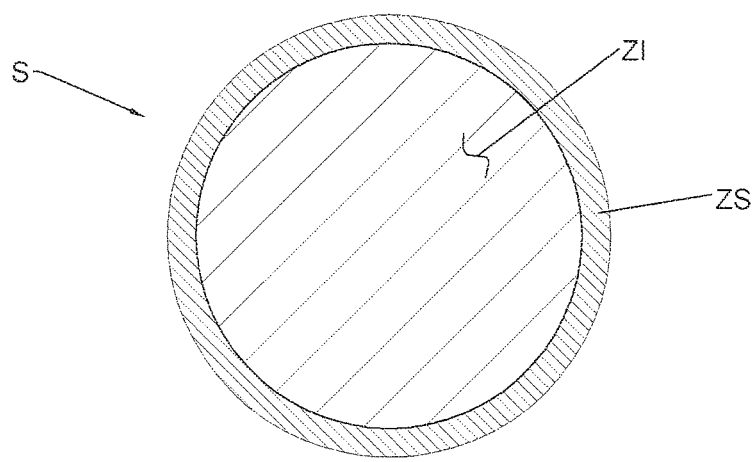
FIG. 6 represents, in a section view according to the section plane π represented in FIG. 5, the inner area and the surface area that define a layer of the central body of the three-dimensional object of FIG. 5.

Furthermore, according to the preferred embodiment of the method of the invention, it is foreseen, for each of the portions to be solidified of the reference surface SR relative to the main body CP of the three-dimensional object O, to distinguish the surface areas ZS from the inner areas ZI of the aforementioned portion, as schematically represented in FIG. 6.

Once such a distinction has been made, the method provides to proceed to the exposure of the aforementioned inner areas ZI through the use of the first optical sub-group 41 and to proceed to the exposure of the surface areas ZS through the use of the second optical sub-group 42.

Such a procedure is in line with the general logic described earlier. Indeed, since the inner areas ZI of each portion of the main body CP can have a large size but, being internal, do not require a high definition, it is advantageous to solidify them with the use of the first optical sub-group 41, whereas for the surface or edge areas ZS, having a substantially limited extension, at least in width, but requiring a high definition, since they indeed represent the visible surface of the real object O intended to be produced, it is more suitable to use the second optical sub-group 42.

Also in this case there is nothing to rule out the possibility that, according to variant embodiments of the method of the invention, the portions of reference surface SR for each layer S relative to the main body CP can be made through the exclusive use of the first optical sub-group 41 or through the exclusive use of the second optical sub-group 42.

Furthermore, there is nothing to rule out the possibility that, according to a variant embodiment of the method of the invention, the distinction of the surface areas ZS and of the inner areas ZI of the aforementioned portions relative to the main body CP and the consequent use of the first or second optical sub-group 41 and 42 to respectively make the first and second can be foreseen independently from the method used to make the portions of the reference surface SR of each layer S relative to the support base BS and/or to the support elements ES.

Furthermore, as stated earlier, in the case in which the stereolithography machine 1 of the invention comprises two distinct radiation sources 31 and 32, respectively associated with the first optical sub-group 41 and with the second optical sub-group 42, and it is intended to simultaneously make two distinct three-dimensional objects O on the same reference surface SR, the method of the invention could provide to activate exclusively the first optical sub-group 41 for the exposure of a first portion of the aforementioned reference surface SR and belonging to the first three-dimensional object O and simultaneously to activate exclusively the second optical sub-group 42 for the exposure of a second portion of the aforementioned reference surface SR and belonging to the second three-dimensional object O. Such an approach advantageously makes it possible to speed up the process for making the three-dimensional objects through the stereolithography machine 1 of the invention.

Moreover, the method of the invention, in the case in which it is intended to use the first optical sub-group 41 provided with a matrix of mirrors 411 for selective solidification, for a series of consecutive layers S, of a portion of three-dimensional object O, could provide to activate such a first optical sub-group 41 not at all of the aforementioned consecutive layers S, but not activate it exclusively for some of such layers S, still obtaining the solidification of the aforementioned portion of object.

Such a result is, indeed, advantageously accomplished by exploiting the "depth of cure" of the electromagnetic radiation that indeed makes it possible to obtain the solidification not only of a single layer so that the first optical sub-group 41 has been activated, but also for the immediately adjacent layers. Clearly, the fact that the first optical sub-group 41 is not activated for all of the aforementioned consecutive layers S determines a reduction of the quality of the solidified portion. However, in the case in which it is intended to define the support base BS and/or the support elements ES with such a technique, such a reduction of the quality has no impact on the end result, due to what has been stated above, on the other hand allowing the production process through the stereolithography machine 1 of the invention to be further sped up. Based on what has been stated, therefore, the stereolithography machine 1 of the invention and the method for making a three-dimensional object of the invention achieve all of the predetermined purposes.

In particular, the purpose of making a stereolithography machine that makes it possible to obtain objects with high definition and at the same time makes it possible to carry out the stereolithography process to make such an object quickly is achieved.

Moreover, the purpose of making a versatile stereolithography machine, i.e. capable of adapting its mode of actuation of the stereolithography process based on the characteristics of the three-dimensional object to be made, in order to obtain an optimal compromise between speed of execution and quality of the object produced, is accomplished.

The invention claimed is:

1. A method for making a three-dimensional object through a stereolithography process using a stereolithography machine, said machine comprising:
a container for a fluid substance adapted to be solidified in layers through exposure to predetermined radiation;
a source of said predetermined radiation;
an optical group configured to direct said predetermined radiation towards a reference surface of said fluid substance, the reference surface arranged inside said container, and said optical group comprising:
a first optical sub-group configured to be exposed to said predetermined radiation so as to instantaneously project the image of a first portion of said fluid to be solidified corresponding to a portion of said three-dimensional object onto said reference surface; and
a second optical sub-group configured to selectively convey said predetermined radiation towards a point of said reference surface and to move said point so as to progressively expose a second portion to be solidified of said reference surface corresponding to a portion of said three-dimensional object; and
a control logic unit configured to control said optical group and said radiation source so as to expose said reference surface to said predetermined radiation, wherein said control logic unit is configured to control said first optical sub-group and said second optical sub-group independently from one another;
said three-dimensional object comprising a main body, a support base, and support elements defined between said support base and said main body, said method comprising the following steps of:
laying a layer of said fluid substance in said container so as to define the reference surface;
exposing said reference surface to said predetermined radiation; and
repeating said laying and said exposure for subsequent layers of said three-dimensional object;
wherein based on the dimensions and definition required for each of the layers of said fluid substance according to respective portions of the three-dimensional object being formed, the control logic is configured to select from exclusively said first optical sub-group, exclusively said second optical sub-group, and a combination of said first and second optical sub-groups through which to direct said predetermined radiation.

2. The method according to claim 1, wherein said support elements and said support base of said three-dimensional object are formed by performing said exposure through said first optical sub-group.

3. The method according to claim 1, wherein for one or more of the layers of said fluid substance for forming said main body of said three-dimensional object, the method comprises:
  distinguishing layer surface areas from layer inner areas;
  exposing said inner areas to said predetermined radiation through said first optical sub-group; and
  exposing said surface areas to said predetermined radiation through said second optical sub-group.

4. The method according to claim 1, wherein the source of said predetermined radiation is a laser source, the control logic further configured to vary the size of the predetermined radiation emitted by the laser source based on whether the source is being directed through the first or the second optical sub-group.

5. A stereolithography machine comprising:
  a container for a fluid substance adapted to be solidified in layers through exposure to predetermined radiation;
  a source of said predetermined radiation;
  an optical group configured to direct said radiation towards a reference surface of said fluid substance inside said container, said optical group comprising:
    a first optical sub-group configured to be exposed to said radiation so as to instantaneously project the image of a first portion of said fluid to be solidified corresponding to a portion of a three-dimensional object being formed onto said reference surface; and
    a second optical sub-group configured to selectively convey said radiation towards a point of said reference surface and to move said point so as to progressively expose a second portion to be solidified of said reference surface corresponding to a portion of said three-dimensional object; and
  a control logic unit configured to control said optical group and said radiation source so as to expose said reference surface to said radiation, wherein said control logic unit is configured to control said first optical sub-group and said second optical sub-group independently from one another;
  said three-dimensional object comprising a main body, a support base, and support elements defined between said support base and said main body, the support base and support elements configured to be separated from said main body,
  wherein said control logic is configured to carry out the following method:
    laying a layer of said fluid substance in said container so as to define the reference surface;
    exposing said reference surface to said radiation; and
    repeating said laying and said exposure for subsequent layers of said three-dimensional object;
  wherein based on the dimensions and definition required for each of the layers of said fluid substance according to respective portions of the three-dimensional object being formed, the control logic is configured to select from exclusively said first optical sub-group, exclusively said second optical sub-group, and a combination of said first and second optical sub-groups through which to direct said radiation.

6. The stereolithography machine according to claim 5, wherein said second optical sub-group comprises a pair of mirrors arranged in series one after the other so as to convey said radiation towards point of said reference surface and to move said point progressively.

7. The stereolithography machine according to claim 6, wherein said pair of mirrors belongs to a galvo head.

8. The stereolithography machine according to claim 6, wherein each mirror of said pair of mirrors is a micro-mirror associated with a support structure through articulation means configured to define a rotation axis therefor, said micro-mirror and said support structure belonging to a micro-opto-electro-mechanical system (MOEMS), and each of said micro-opto-electro-mechanical systems (MOEMS) also comprising actuator means adapted to move its micro-mirror around said axis.

9. The stereolithography machine according to claim 5, wherein said first optical sub-group comprises a matrix of mirrors configured to be controlled individually so as to instantaneously project said image onto said reference surface.

10. The stereolithography machine according to claim 5, wherein said control logic unit is configured to control said source so as to direct said radiation alternatively towards said first optical sub-group or towards said second optical sub-group.

11. The stereolithography machine according to claim 5, wherein the source of said radiation is a laser source, the control logic further configured to vary the size of the radiation emitted by the laser source based on whether the source is being directed through the first or the second optical sub-group.

\* \* \* \* \*